United States Patent
Brekke (10) Patent No.: US 10,011,475 B1
(45) Date of Patent: Jul. 3, 2018

(54) BUCKET BOTTLING STAND

(71) Applicant: Wayne Earle Brekke, Elk City, OK (US)

(72) Inventor: Wayne Earle Brekke, Elk City, OK (US)

( * ) Notice: Subject to any disclaimer, the term of this patent is extended or adjusted under 35 U.S.C. 154(b) by 0 days.

(21) Appl. No.: 15/834,320

(22) Filed: Dec. 7, 2017

Related U.S. Application Data (60) Provisional application No. 62/432,723, filed on Dec. 12, 2016.

(51) Int. Cl.
| | |
|---|---|
| *B67D 3/00* | (2006.01) |
| *F16M 11/38* | (2006.01) |
| *F16M 11/18* | (2006.01) |
| *F16M 11/10* | (2006.01) |
| *B65G 65/23* | (2006.01) |

(52) U.S. Cl.
CPC ........... *B67D 3/0051* (2013.01); *B65G 65/23* (2013.01); *B67D 3/0083* (2013.01); *F16M 11/10* (2013.01); *F16M 11/18* (2013.01); *F16M 11/38* (2013.01)

(58) Field of Classification Search
CPC .. B67D 1/0889; B67D 1/0891; B67D 1/0892; B67D 3/0083; B65G 65/23; F16M 11/38
USPC .......................... 141/253, 272; 222/164, 166
See application file for complete search history.

(56) References Cited

U.S. PATENT DOCUMENTS

| | | | |
|---|---|---|---|
| 533,687 A * | 2/1895 | Walker | B67D 1/0891 |
| | | | 222/166 |
| 7,334,908 B1 | 2/2008 | Figueroa | |
| 9,609,943 B1 * | 4/2017 | Lin | A47B 3/02 |
| 9,708,171 B1 * | 7/2017 | Highum | B67D 3/0083 |
| 2005/0092623 A1 | 5/2005 | Cuomo | |
| 2005/0252919 A1 | 11/2005 | Morse | |
| 2012/0085664 A1 | 4/2012 | Chin | |
| 2012/0104041 A1 | 5/2012 | Coleman | |
| 2017/0050764 A1 * | 2/2017 | Caul, III | F16B 47/00 |

FOREIGN PATENT DOCUMENTS

| | | | | |
|---|---|---|---|---|
| CA | 563295 | | 9/1958 | |
| CN | 201356376 | | 12/2009 | |
| CN | 201398858 | | 2/2010 | |
| CN | 102101556 | | 6/2011 | |
| CN | 202234822 | | 5/2012 | |
| GB | 817188 | | 7/1959 | |
| GB | 2271550 A | * | 4/1994 | ............. B65G 65/23 |
| GB | 2272878 A | * | 6/1994 | ............... B65G 7/08 |

\* cited by examiner

*Primary Examiner* — Timothy L Maust
*Assistant Examiner* — Timothy P Kelly
(74) *Attorney, Agent, or Firm* — Shane V. Cortesi (57) ABSTRACT

A bucket bottling stand is described. The bucket bottling stand may comprise a top platform and a bottom platform that are attached via a hinge and one or more springs. The top surface of the top platform may include a recess for holding a container and the front of the top and bottom platform may include a hemispherical cut-out. One or more legs may be attached to the bottom platform. Upon emptying a container located on the top platform, the spring may tilt the top platform relative to the bottom platform to aid in dispensing the container.

22 Claims, 6 Drawing Sheets

BUCKET BOTTLING STAND

RELATED APPLICATIONS

This application claims priority under 35 USC 119 to U.S. Provisional Application No. 62/432,723, filed Dec. 12, 2016, the entire contents of which are incorporated by reference in their entirety.

BACKGROUND

Technical Field

The present invention relates to accessories for bottling items.

Background of the Invention

Honey and other substances are time consuming to bottle. Thus, there is a need for easy to use, ergonomic time saving items for bottling.

BRIEF SUMMARY

The present disclosure provides a bucket bottling stand as described herein.

In some embodiments, the bucket bottling stand includes a bottom platform comprising a bottom platform top surface and a bottom platform bottom surface located below the bottom platform top surface. Optionally, the bottom platform further includes a front comprising a cut-out and a rear opposite the front. Optionally, the bucket bottling stand includes at least one leg configured to support the bucket bottling stand. Optionally, the bucket bottling stand also includes a top platform located above the bottom platform and comprising a top platform top surface comprising a recess and a top platform bottom surface located below the top platform top surface and located above and facing the bottom platform top surface. Optionally, the top platform further comprises a front comprising a cut-out and a rear opposite the front. Optionally, the bucket bottling stand also includes at least one hinge attaching the front of the top platform to the front of the bottom platform. Optionally, the bucket bottling stand also includes at least one compressible spring disposed rearwardly relative to the at least one hinge and attaching the top platform to the bottom platform. Optionally, the at least one compressible spring is configured to bias the top platform in a tilted position in which the top platform is angled relative the bottom platform. Optionally, placing a full container in the recess is configured to compress the compressible spring and move the rear of the top platform toward the rear of the bottom platform as the top surface of the top platform pivots about the at least one hinge. Optionally, the recess is generally circular in shape. Optionally, the cut-out of the top platform extends rearwardly into the recess. Optionally, the cut-out of the top platform is generally hemi-spherical in shape. Optionally, the cut-out of the top platform is smaller than the cut-out of the bottom platform. Optionally, the top platform comprises a length extending from the top platform front to the top platform rear, a width perpendicular to the length, the width comprises a center, and the cut-out of the top platform is located approximately in the center of the width. Optionally, the at least one leg is foldable. Optionally, the top platform and the bottom platform are substantially the same size and shape. Optionally, the at least one spring comprises a top end, a bottom end, and a compressible length expending from the top end to the bottom end, the bottom surface of the top platform comprises a top platform spring socket, the top surface of the bottom platform comprises a bottom platform spring socket, the top end of the at least one spring is located in the top platform spring socket, and the bottom end of the at least one spring is located in the bottom platform spring socket. Optionally, the at least one spring comprises a top end, a bottom end, and a compressible length expending from the top end to the bottom end, and the spring length is generally perpendicular to the bottom platform. Optionally, the bucket bottling stand comprises two springs located on opposite sides of the bucket bottling stand. Optionally, the bucket bottling stand comprises two u-shaped legs, the u-shaped legs connected at two pivots, the u-shaped legs having a storage position in which one of the u-shaped legs is nested inside the other of the u-shaped legs, and in which the u-shaped legs are located adjacent to the bottom surface of the bottom platform and a deployed position in which the u-shaped legs pivot about the two pivots and the u-shaped legs intersect below the bottom surface of the bottom platform. Optionally, the bottom surface of the bottom platform comprises a recess configured to receive the u-shaped legs when the u-shaped legs are in the storage position.

Optionally, the bucket bottling stand is used in a method that includes: a) providing the bucket bottling stand; b) placing a first container on the recess, the first container comprising a liquid; c) positioning a second container in the cut-outs; and d) dispensing the liquid from the first container into the second container.

Optionally, during step d), the method further comprises tilting the rear of the top platform so that the rear of the top platform moves upwardly relative to the rear of the bottom platform and the top platform pivots about the hinge and the at least one spring relaxes. Optionally, the first and second containers each comprise a volume and further wherein the volume of the first container is greater than the volume of the second container. Optionally, the first container comprises a valve.

BRIEF DESCRIPTION OF THE DRAWINGS

FIG. 1 illustrates a front perspective view of a bucket bottling stand of one embodiment of the present invention; in FIG. 1, the springs are in the compressed state, the top platform is in the resting position, the legs are in the storage position, and the first container is being used to fill a second container.

DETAILED DESCRIPTION

With reference to FIGS. 1-9, the present invention provides a bucket bottling stand 10. In the drawings, not all reference numbers are included in each drawing for the sake of clarity. FIGS. 1-9 are CAD drawings, drawn to scale. However, it will be appreciated that other dimensions are possible.

Referring further to FIGS. 1-9, the bucket bottling stand 10 may include a bottom platform 12 comprising a bottom platform top surface 22 and a bottom platform bottom surface 20 located below the bottom platform top surface 22. The bottom platform 12 may further include a front 24 comprising a cut-out 28 and a rear 26 opposite the front 24.

The bucket bottling stand 10 may further include at least one leg (shown as two legs 14A and 14B in the illustrations) configured to support the bucket bottling stand 10. The leg(s) 14A and 14B may include a top end attached or otherwise secured to the bottom platform 12 and a bottom end 18 located below the bottom platform 12 (at least when the leg(s) 14A and 14B is in the deployed position described below).

The bucket bottling stand 10 may further include a top platform 30 located above the bottom platform 12 and comprising a top platform top surface 34 comprising a recess/indented region 32 that forms a lip and a top platform bottom surface located 36 below the top platform top surface 34 and located above and facing the bottom platform top surface 22, the top platform 30 further comprising a front 38 that may include a cut-out 42 and a rear 40 opposite the front 38. The top platform recess 32 may be configured to hold a container, preferably a barrel 48.

The bucket bottling stand 10 may further include at least one hinge 44 attaching the front 38 of the top platform 30 to the front 24 of the bottom platform 12. The at least one hinge 44 may utilize hinge pins 68 that pass through flanges 76 and 78 located on the top platform 30 and bottom platform 12.

Figure 1:
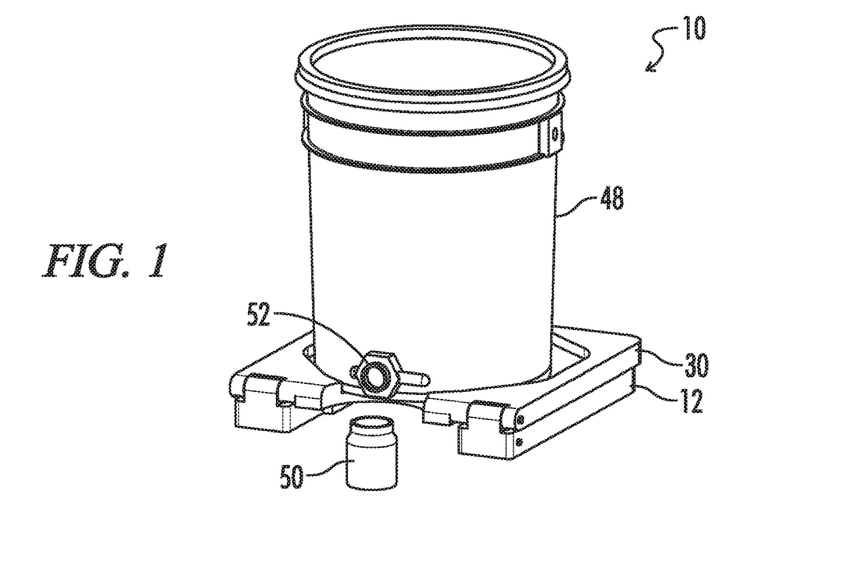
Figure 2:
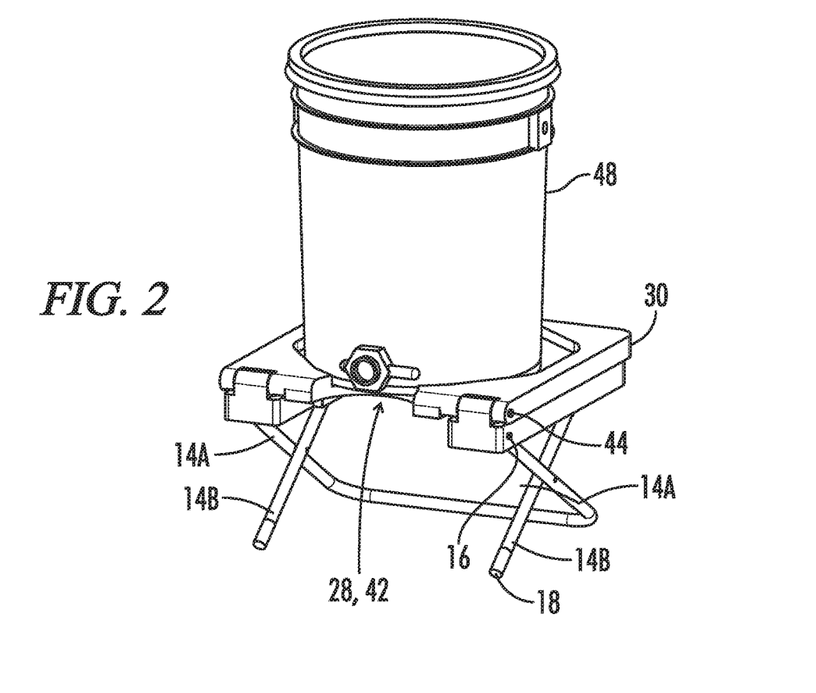
FIG. 2 illustrates a front perspective view of the bucket bottling stand of FIG. 1 with the legs in the deployed position.
Figure 3:
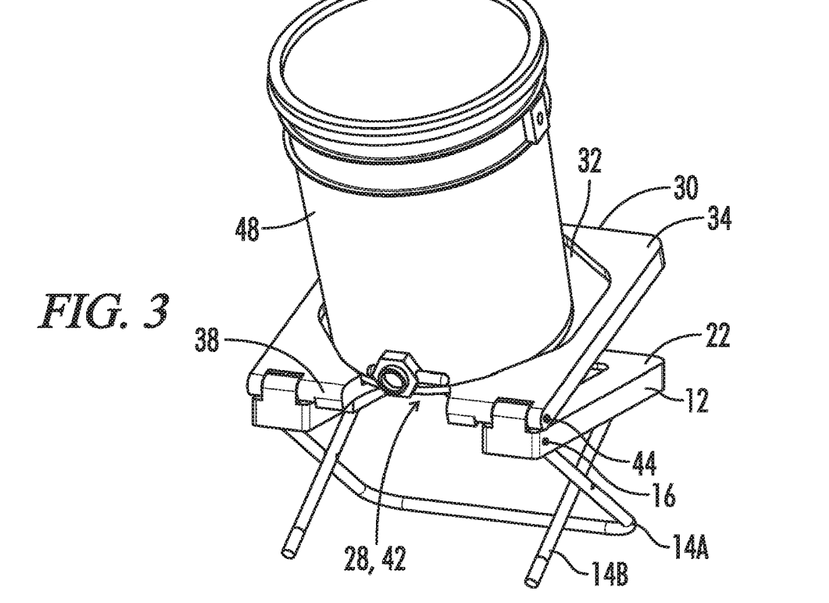
FIG. 3 illustrates a front perspective view of the bucket bottling stand of FIG. 1 with the legs in the deployed position, the springs in the relaxed state and the top platform in the tilted position.
Figure 4:
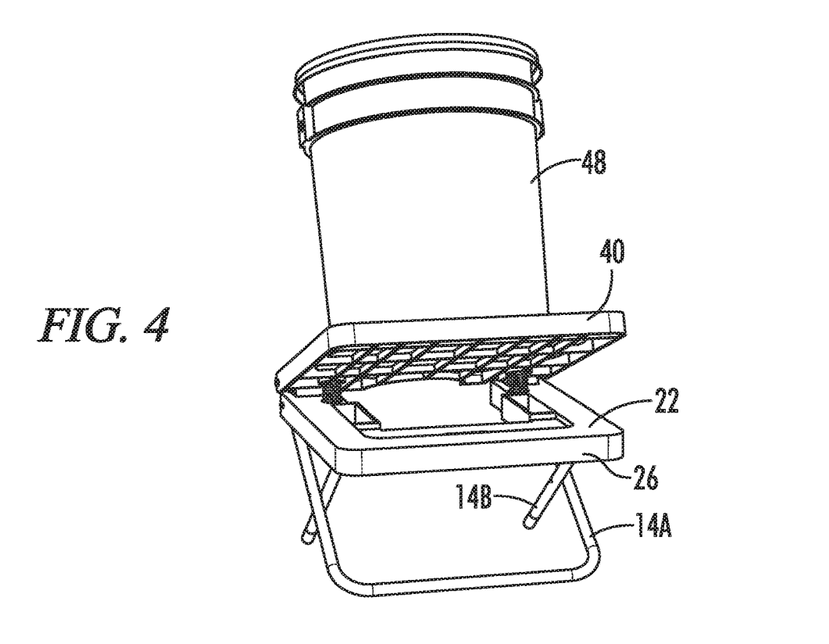
FIG. 4 illustrates a rear perspective view of the bucket bottling stand of FIG. 3.
Figure 5:
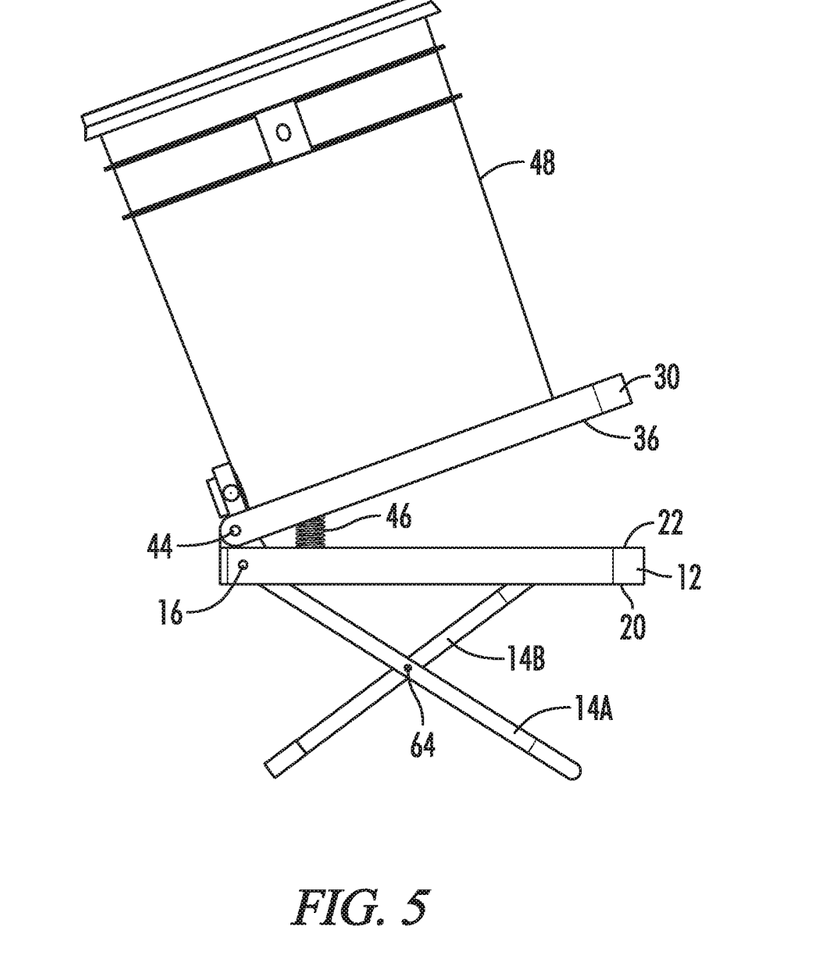
FIG. 5 illustrates a right side perspective view of the bucket bottling stand of FIG. 3.
Figure 6:
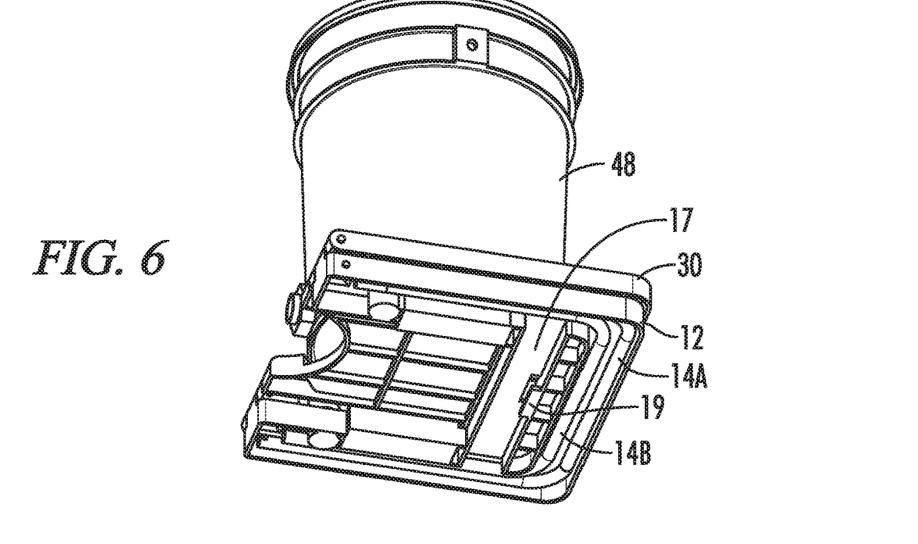
FIG. 6 illustrates a bottom perspective view of the bucket bottling stand of FIG. 1.
Figure 7:
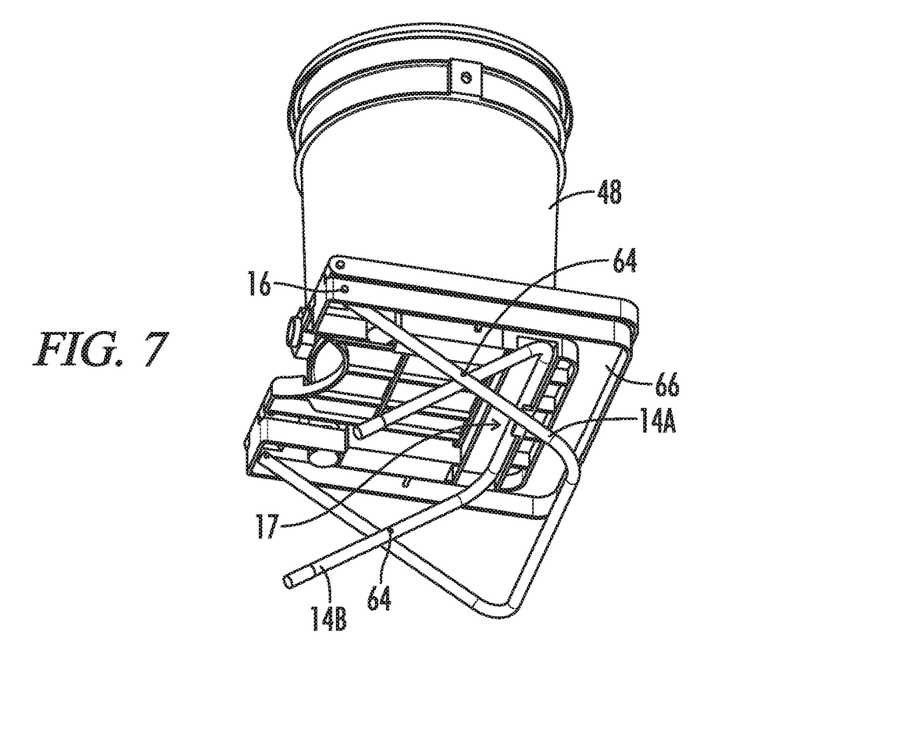
FIG. 7 illustrates a bottom perspective view of the bucket bottling stand of FIG. 2.
Figure 8:
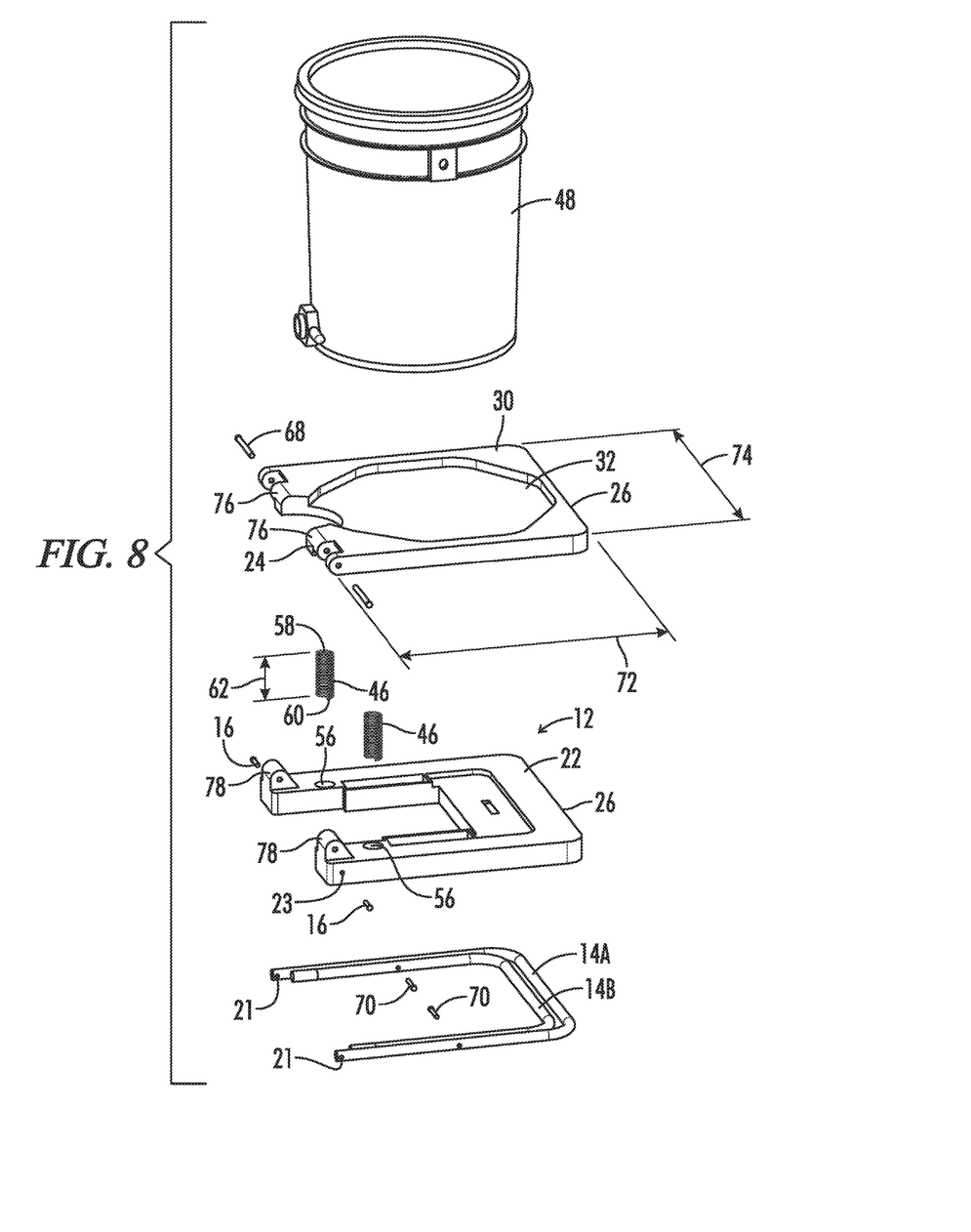
FIG. 8 illustrates a top exploded perspective view of the bucket bottling stand of FIG. 1.
Figure 9:
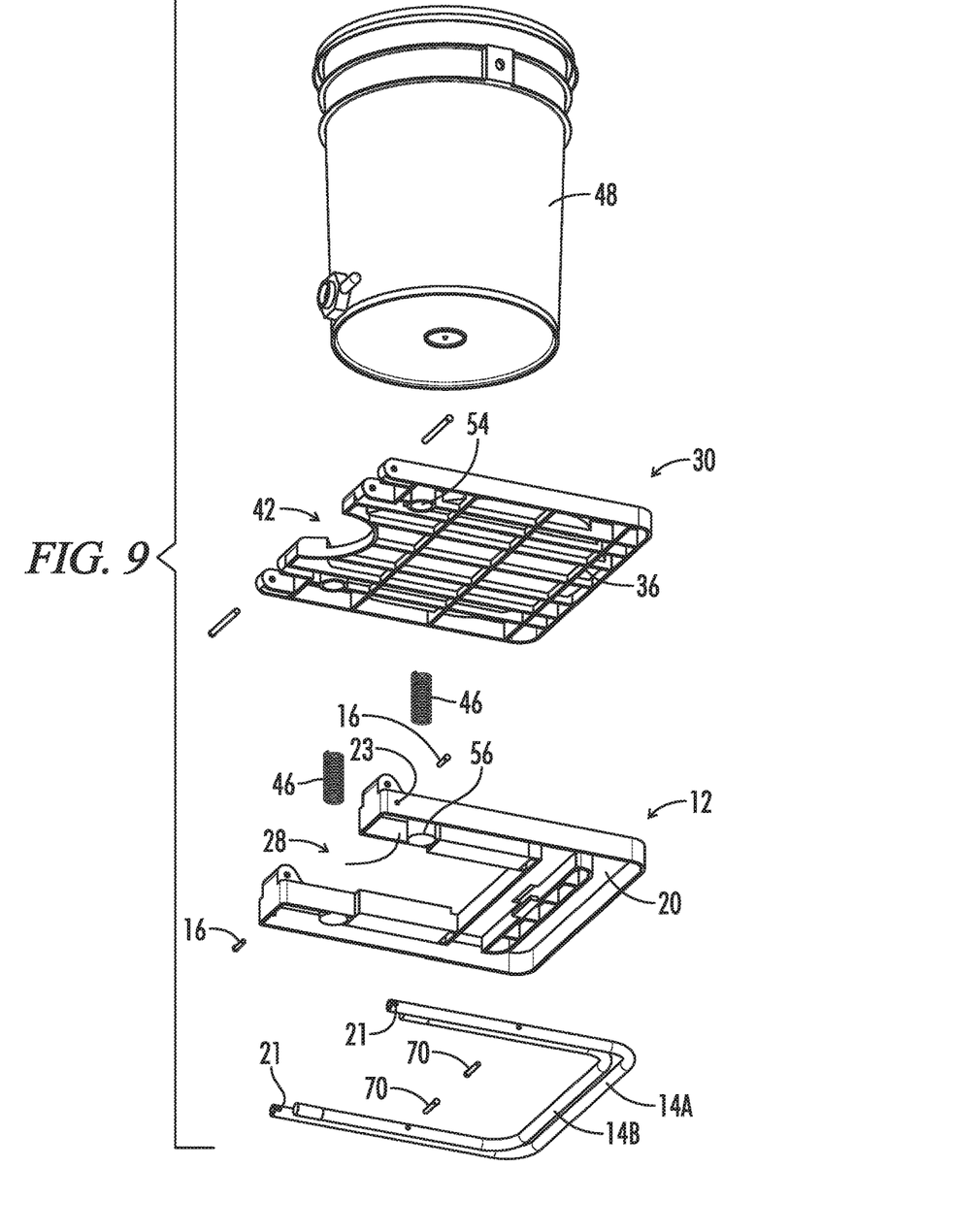
FIG. 9 illustrates a bottom exploded perspective view of the bucket bottling stand of FIG. 1.

The bucket bottling stand 10 may further include at least one compressible spring 46 disposed rearwardly relative to the at least one hinge 44 and attaching the top platform 30 to the bottom platform 12. The at least one compressible spring 46 may be configured to bias the top platform 30 in a tilted position in which the top platform 30 is angled relative the bottom platform 12, as shown in FIGS. 3-5. Optionally, placing a full container 48 (i.e., a container that is full of liquid such as honey or water or a solid such as sand) in the recess 32 is configured to compress the compressible spring 46 and move the rear 40 of the top platform 30 toward the rear 26 of the bottom platform 12 as the top platform 30 pivots about the at least one hinge 44, as shown in FIGS. 1-2 and 6-7. The full container 48 may have a weight of at least about 25 pounds, for example, 25 pounds to 200 pounds. It being understood that the weight will vary depending on the size of the container 48. Without being bound by any particular theory, the container 48, which may be in the form of a barrel, may tilt, as shown in FIGS. 3-5, as its liquid or solid contents are transferred to a second container 50 (which may be in the form of a jar for example), and the tilting action may facilitate emptying the container 48 when its liquid contents are transferred to the second container 50. Without being bound by any particular theory, the recess 32 may be configured to hold the container 48 in place during the tilting process. Optionally, the recess 32 is generally circular in shape and has a diameter of between for example about 6 inches and about 18 inches, for example, about 12 inches. However, it will be understood that such dimensions are only exemplary.

The cut-outs 28 and 42 may be configured to facilitate transfer of the liquid or solid into the second container 50 shown as a jar in the illustrated embodiments. The cut-out 42 of the top platform 30 is preferably aligned with the cut-out 28 of the bottom platform 12. Optionally, the cut-out 42 of the top platform 30 extends rearwardly into the recess 32. Optionally, the cut-out 42 of the top platform 30 is generally hemi-spherical in shape to facilitate filling a cylindrical jar 50. Optionally, the cut-out 42 of the top platform 30 is smaller than the cut-out 28 of the bottom platform 12, which reflects the fact that the top platform 30 supports the barrel 48. The term cut-out 42 and 28 merely reflects the fact that a portion of the fronts 38 and 24 of the top platform 30 and bottom platform 12 extends inward (toward the rear 40 and 26 of the top platform 30 and bottom platform 12) and does not require that material be removed in the process of forming the cut-outs 42 and 28. For example, the top platform 30 and bottom platform 12, including cut-outs 42 and 28, may be injection molded plastic. Optionally, the cut-outs 42 and 28 are centered in the platforms 12 and 30. More particularly, the top platform 30 may comprise a length 72 extending from the top platform front 38 to the top platform rear 40, a width 74 perpendicular to the length 72, and the width 74 has a center, and the cut-out 42 of the top platform 30 is located in the center of the width 74.

Optionally, the top platform 30 and the bottom platform 12 are substantially the same size and shape. For example, in the illustrated embodiment, the top and bottom platform 30 and 12 are generally rectangular.

Optionally, the leg(s) 14A and 14B is foldable. For example, the bucket bottling stand may comprise two u-shaped legs 14A and 14B (as shown in FIGS. 1-9), the u-shaped legs 14A and 14B connected at two pivots by leg pins 70, the u-shaped legs 14A and 14B having a storage position (shown in FIG. 6 for example and in the exploded views of FIGS. 8 and 9) in which one of the u-shaped legs 14B is nested inside the other of the u-shaped legs 14A, and in which the u-shaped legs 14A and 14B are located adjacent to the bottom surface 20 of the bottom platform 12 and a deployed position (shown in FIGS. 2-5 and 7) in which the u-shaped legs 14A and 14B pivot about the two pivots and the u-shaped legs 14A and 14B intersect below the bottom surface 20 of the bottom platform 12. The top of the outer u-shaped leg 14A may be attached to the bottom platform 20 by front attachment pivot pins 16 that pass through holes 21 in the outer u-shaped leg 14A and holes 23 in the bottom platform 20 and allow the outer u-shaped leg 14A to pivot about the bottom platform 20 as the outer u-shaped leg 14A moves between the storage and deployed positions. Optionally, the bottom surface 20 of the bottom platform 12 comprises a recess 66 configured to receive the u-shaped legs 14A and 14B when the u-shaped legs 14A and 14B are in the storage position. Without being bound by any particular theory, the storage feature of the legs 14A and 14B allows the bucket bottling stand 10 to be portable. In addition, the bottom surface 20 of the bottom platform 12 may include a recess 17 with a rectangular flange/overhang 19 that is specifically designed to secure the top of the inner u-shaped leg 14B when the inner u-shaped leg 14B is in the deployed position, as best seen by comparing FIG. 6 with FIG. 7. In other words, the top of the inner u-shaped leg 14B may not be attached to the bottom platform 20 but rather rests inside a first recess 20 in the storage position, and a second recess 17 in the deployed position where the flange/overhang 19 secures the top of the inner u-shaped leg 14B in place.

Optionally, the at least one spring 46 comprises a top end 58, a bottom end 60, and a compressible length 62 expending from the top end 58 to the bottom end 60, wherein the bottom surface 36 of the top platform 30 comprises a top platform spring socket 54, wherein the top surface 22 of the bottom platform 12 comprises a bottom platform spring socket 56, the top end 58 of the at least one spring 46 is located in the top platform spring socket 54, and further wherein the bottom end 60 of the at least one spring 46 is located in the bottom platform spring socket 56. The at least one spring 46 may be closer to the top platform front 30 and bottom platform front 24 (as opposed to the rears 40 and 26) to reduce the spring length 62 that is needed for the tilting feature. Optionally, the spring length 62 is generally perpendicular to the bottom platform 12 and the bottom platform 12 is generally parallel to the ground. Optionally, the bucket bottling stand 10 comprises two springs 46 located on opposite sides of the bucket bottling stand 10.

The bucket bottling stand 10 may be used in any suitable method. For example, the bucket bottling stand 10 may be used in a method that includes: a) providing the bucket bottling stand 10; b) placing a first container 48 (e.g., the barrel) on the recess 32, the first container 48 comprising a liquid; c) positioning a second container 50 (e.g., the jar) in the cut-outs 42 and 28; and d) dispensing the liquid from the first container 48 into the second container 50. Optionally, during step d), the method further comprises tilting the rear 40 of the top platform 30 so that the rear 40 of the top platform 30 moves upwardly relative to the rear 26 of the bottom platform 12 and the top platform 30 pivots about the hinge 44 and the at least one spring 46 relaxes. (It will be understood that such movement will generally be incremental and gradual). Optionally, the first and second containers 48 and 50 each comprise a volume and further wherein the volume of the first container 48 is greater than the volume of the second container 50. Optionally, the first container 48 comprises a valve 52 to prevent the first container 48 from dispensing liquid when the second container 50 is removed.

| Part List | |
|---|---|
| Bucket bottling stand | 10 |
| bottom platform | 12 |
| outer u-shaped leg (attached via leg front attachment pin) | 14A |
| inner u-shaped leg | 14B |
| leg front attachment pin | 16 |
| recess | 17 |
| leg bottom end | 18 |
| flange | 19 |
| bottom platform bottom surface | 20 |
| hole in outer u-shaped leg | 21 |
| bottom platform top surface | 22 |
| hole in bottom platform | 23 |
| bottom platform front | 24 |
| bottom platform rear | 26 |
| bottom platform cut-out | 28 |
| top platform | 30 |
| top platform recess | 32 |
| top platform top surface | 34 |
| top platform bottom surface | 36 |
| top platform front | 38 |
| top platform rear | 40 |
| top platform cut-out | 42 |
| hinge | 44 |
| spring | 46 |

-continued

| Part List | |
|---|---|
| first container | 48 |
| second container | 50 |
| first container valve | 52 |
| top platform spring socket | 54 |
| bottom platform spring socket | 56 |
| top end of spring | 58 |
| bottom end of spring | 60 |
| spring length | 62 |
| u-shaped leg pivot | 64 |
| bottom platform recess | 66 |
| hinge pins | 68 |
| leg pins | 70 |
| top platform length | 72 |
| top platform width | 74 |
| top platform flange | 76 |
| bottom platform flange | 78 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A system for dispensing contents from a first container into a second container comprising:
 a) a generally cylindrical first container having a top, a generally circular bottom, a height extending from the top to the bottom, an interior comprising contents, and a spout located between the top and the bottom and configured to dispense the contents into a second container; and
 b) a bucket bottling stand comprising:
  i) a bottom platform comprising a bottom platform top surface and a bottom platform bottom surface located below the bottom platform top surface, the bottom platform further comprising a front comprising a cut-out and a rear opposite the front;
  ii) at least one leg extending from the bottom platform and configured to support the bucket bottling stand;
  iii) a top platform located above the bottom platform and comprising a top platform top surface comprising a recess and a top platform bottom surface located below the top platform top surface and located above and facing the bottom platform top surface, the top platform further comprising a front comprising a cut-out and a rear opposite the front;
  iv) at least one hinge attaching the front of the top platform to the front of the bottom platform; and
  v) at least one spring disposed rearwardly relative to the at least one hinge and extending from the top platform to the bottom platform,
 wherein the at least one spring is configured to bias the top platform in a tilted position in which the top platform is angled relative to the bottom platform, and further wherein the bottom of the first container is located in the recess in an upright position, and further wherein the spring is configured to relax and move the rear of the top platform away from the rear of the bottom platform as the top platform pivots about the at least one hinge as the contents of the first container are emptied.

2. The system of claim 1 wherein the cut-out of the bottom platform and the cut-out of the top platform create a continuous cut-out located below the spout.

3. The system of claim 2 wherein the cut-out of the top platform extends rearwardly into the recess.

4. The system of claim 3 wherein the cut-out of the top platform is generally semi-cylindrical in shape and comprises a base and an apex, the apex disposed rearwardly relative to the base.

5. The system of claim 1 wherein the cut-out of the top platform is smaller than the cut-out of the bottom platform.

6. The system of claim 1 wherein the top platform comprises a length extending from the top platform front to the top platform rear, a width perpendicular to the length, wherein the width comprises a center, and further wherein the cut-out of the top platform is located approximately in the center of the width.

7. The system of claim 1 wherein the at least one leg is foldable.

8. The system of claim 1 wherein the top platform and the bottom platform are substantially the same size and shape.

9. The system of claim 1 wherein the at least one spring comprises a top end, a bottom end, and a compressible length extending from the top end to the bottom end and generally parallel to the first container height, wherein the bottom surface of the top platform comprises a top platform spring socket, wherein the top surface of the bottom platform comprises a bottom platform spring socket, wherein the top end of the at least one spring is located in but not attached to the top platform spring socket, and further wherein the bottom end of the at least one spring is located in but not attached to the bottom platform spring socket.

10. The system of claim 1 wherein the at least one spring comprises a top end, a bottom end, and a compressible length extending from the top end to the bottom end and generally parallel to the first container height, and further wherein the spring length is generally perpendicular to the bottom platform.

11. The system of claim 10 wherein the system comprises two springs located on opposite sides of the bottom platform cut-out.

12. The system of claim 1 wherein the bucket bottling stand comprises two u-shaped legs, the u-shaped legs connected at two pivots, the u-shaped legs having a storage position in which one of the u-shaped legs is nested inside the other of the u-shaped legs, and in which the u-shaped legs are located adjacent to the bottom surface of the bottom platform and a deployed position in which the u-shaped legs pivot about the two pivots and the u-shaped legs intersect below the bottom surface of the bottom platform.

13. The system of claim 12 wherein the bottom surface of the bottom platform comprises at least one recess configured to receive the u-shaped legs when the u-shaped legs are in the storage position.

14. The system of claim 12 wherein each u-shaped leg comprises a top end, wherein the top end of one of the u-shaped legs is attached to the bottom platform and further wherein the bottom platform is configured to releasably secure the top end of the other u-shaped leg.

15. A method of bottling comprising the steps of:
a) providing a bucket bottling stand comprising:
  i) a bottom platform comprising a bottom platform top surface and a bottom platform bottom surface located below the bottom platform top surface, the bottom platform further comprising a front comprising a cut-out and a rear opposite the front;
  ii) at least one leg extending from the bottom platform and configured to support the bucket bottling stand;
  iii) a top platform located above the bottom platform and comprising a top platform top surface comprising a recess and a top platform bottom surface located below the top platform top surface and located above and facing the bottom platform top surface, the top platform further comprising a front comprising a cut-out and a rear opposite the front;
  iv) at least one hinge attaching the front of the top platform to the front of the bottom platform;
  v) at least one spring disposed rearwardly relative to the at least one hinge and extending from the top platform to the bottom platform,
wherein the at least one spring is configured to bias the top platform in a tilted position in which the top platform is angled relative to the bottom platform,
and further wherein placing a full container in the recess is configured to compress the at least one spring and move the rear of the top platform toward the rear of the bottom platform as the top platform pivots about the at least one hinge;
b) placing a first container on the recess, the first container comprising contents;
c) positioning a second container in the cut-outs; and
d) dispensing the contents from the first container into the second container.

16. The method of claim 15, wherein, during step d), the method further comprises tilting the rear of the top platform so that the rear of the top platform moves upwardly relative to the rear of the bottom platform and the top platform pivots about the hinge and the at least one spring relaxes.

17. The method of claim 15 wherein the first and second containers each comprise a volume and further wherein the volume of the first container is greater than the volume of the second container.

18. The method of claim 15 wherein the first container comprises a valve.

19. The system of claim 1 wherein the bucket bottling standing comprises at least two springs, each spring comprising a top end, a bottom end, and a compressible length expending from the top end to the bottom end and generally parallel to the first container height, wherein the bottom surface of the top platform comprises two top platform spring sockets, wherein the top surface of the bottom platform comprises two bottom platform springs, wherein the top end of each spring is located in but not attached to a top platform spring socket, and further wherein the bottom end of a spring is located in but not attached to a bottom platform spring socket.

20. The system of claim 19 wherein the spring sockets of the bottom platform are located on opposite sides of the cut-out of the bottom platform.

21. The system of claim 1 wherein the contents are a liquid.

22. The system of claim 1 wherein the contents are a solid.

* * * * *